Patented May 27, 1952

2,598,542

UNITED STATES PATENT OFFICE 2,598,542

PROCESS FOR THE MANUFACTURE OF BASIC ESTERS OF $\alpha,\alpha$-DIARYL-$\alpha$-ALKOXY-ACETIC ACIDS

Rudolf Hirt, Muri, near Berne, Switzerland, assignor to Dr. A. Wander A.-G., Berne, Switzerland No Drawing. Application January 2, 1948, Serial No. 383. In Switzerland January 23, 1947

3 Claims. (Cl. 260—473)

It has been found that diphenyl-propoxy-acetic acid-diethyl-amino-ethyl ester may be produced, and that such ester has interesting pharmocological effects.

Good yields of this new compound can be obtained by treating diphenyl-chloroacetic acid ester with sodium metal and propyl alcohol, saponifying the resulting $\alpha,\alpha$-diphenyl-propoxy-acetic acid ester with an alcoholic alkali hydroxide solution, and reacting the obtained $\alpha,\alpha$-diphenyl-propoxy-acetic acid with a chloroethyl-diethyl-amine in the presence of sodium metal and an alcohol. The reaction is soon terminated when applying heat. Following distillation in a high vacuum, the ester is obtained as a colorless, thick liquid. It is readily soluble in dilute acids.

Example 9 gm. of diphenyl-chloro-acetic acid-ethyl ester are boiled for 1 hour under a reflux condenser with a solution of 0.9 gm. of sodium in 40 c. c. of absolute propyl alcohol. After processing accordingly $\alpha,\alpha$-diphenyl-propoxy-acetic acid ester having a B. P. 0.5:160° is obtained, and from this latter substance diphenyl-propoxy-acetic acid is produced by saponification with alcoholic potassium hydroxide solution. It melts at 100°. 6.5 gm. of this acid are dissolved in a solution of 0.6 gm. of sodium in 50 c. c. of absolute alcohol. This solution is then treated with 5 gs. of chlorethyl-diethylamine. After boiling for one hour under a reflux condenser, the alcohol is removed by distillation in a vacuum, the residue is suspended in dilute hydrochloric acid and the solution is clarified by filtration through animal charcoal. The base is precipitated with an excess of ammonia and suspended in ether. The ether is dried and removed by distillation. The residue is distilled in a high vacuum. There is thus obtained diphenyl-propoxy-acetic acid-diethyl-amino-ethylester, as a thick oil having a B. P. 0.2:175–180° C.

What I claim is:

1. A process for the preparation of diphenyl-propoxy-acetic acid-diethyl-amino-ethyl ester, including the steps of reacting $\alpha,\alpha$-diphenyl-propoxy-acetic acid with a chloroethyl-diethyl-amine in the presence of sodium metal and an alcohol.

2. A process for the preparation of diphenyl-propoxy-acetic-acid-diethyl-amino - ethyl - ester including the steps of treating diphenyl-chloroacetic acid ester with sodium metal and propyl alcohol, saponifying the resulting $\alpha,\alpha$-diphenyl-propoxy-acetic acid ester with an alcoholic alkali hydroxide solution, and reacting the obtained $\alpha,\alpha$-diphenyl-propoxy-acetic acid with chloroethyl-diethyl-amine in the presence of sodium metal and an alcohol.

3. A process for the preparation of diphenyl-propoxy-acetic-acid-diethyl-amino - ethyl - ester including the steps of treating diphenyl-chloroacetic acid ester with sodium metal and propyl alcohol, saponifying the resulting $\alpha,\alpha$-diphenyl-propoxy-acetic acid ester with an alcoholic potassium hydroxide solution, and reacting the obtained $\alpha,\alpha$-diphenyl-propoxy-acetic acid with chloroethyl-diethyl-amine in the presence of sodium metal and an alcohol.

RUDOLF HIRT.

REFERENCES CITED

The following references are of record in the file of this patent:

UNITED STATES PATENTS

| Number | Name | Date |
|---|---|---|
| 2,394,770 | Hill et al. | Feb. 12, 1946 |
| 2,399,736 | Holmes et al. | May 7, 1946 |
| 2,401,219 | Blicke | May 28, 1946 |
| 2,430,116 | Holmes et al. | Nov. 4, 1947 |